United States Patent [19]
Eckman et al.

[11] 4,015,104
[45] Mar. 29, 1977

[54] CONTROL SYSTEM FOR ELECTRICALLY OPERATED HEAT GENERATING APPARATUS

[75] Inventors: Raymond L. Eckman, Manlius; Russell E. Wood, Fayetteville, both of N.Y.

[73] Assignee: Carrier Corporation, Syracuse, N.Y.

[22] Filed: Jan. 17, 1975

[21] Appl. No.: 541,750

[52] U.S. Cl. .............................. 219/485; 219/476; 219/483

[51] Int. Cl.² .......................................... H05B 1/02

[58] Field of Search .......... 219/476, 479, 480, 483, 219/484, 485, 486, 488; 236/1 B, 1 C, 46, 68 C, 91; 307/33

[56] References Cited

UNITED STATES PATENTS

| | | | |
|---|---|---|---|
| 3,161,758 | 12/1964 | Biermann et al. | 219/486 |
| 3,496,337 | 2/1970 | Voglesonger | 219/486 |
| 3,560,712 | 2/1971 | Toohill | 219/483 |
| 3,586,869 | 6/1971 | Kompelien | 219/486 |
| 3,767,894 | 10/1973 | Berger | 219/485 X |

FOREIGN PATENTS OR APPLICATIONS

| | | | |
|---|---|---|---|
| 1,025,540 | 3/1958 | Germany | 219/483 |
| 387,711 | 1/1924 | Germany | 219/483 |

*Primary Examiner*—J D Miller
*Assistant Examiner*—Fred E. Bell
*Attorney, Agent, or Firm*—J. Raymond Curtin; Barry E. Deutsch

[57] ABSTRACT

A control system for controlling energization of electrically operated heat generating apparatus included in a multizone electrical heating system. Each of the zones has at least two parallel connected heat generating stages. The second stage heat generating apparatus in any of the zones is prevented from being energized irrespective of the temperature level in the zone when the number of the first stages already activated in each of the zones is greater than a preselected fraction of the total of the first stages.

8 Claims, 4 Drawing Figures

CONTROL SYSTEM FOR ELECTRICALLY OPERATED HEAT GENERATING APPARATUS

BACKGROUND OF THE INVENTION

This invention relates to a control system for controlling the energization of electrically operated multizone heat generating apparatus, and in particular, to a control system for such apparatus having at least two parallel connected heat generating stages provided in each of the zones served by the apparatus.

In recent years, the use of a single electrically operated heat generating apparatus to provide warm air to a plurality of zones in a common enclosure has become quite popular. Buildings such as small office buildings and shopping malls, have proven to be particularly suitable for such apparatus whereat the heat generating apparatus may be conveniently located on the roof of the building. Generally, installations using such multizone heat generating apparatus are commercial in nature. The users of electrical power are charged by the power company at commercial rates which are generally based upon the total watt usage multiplied by a number indicative of the demand rate. The demand rate multiplier is typically based on the peak 30 minutes of usage during any billing period.

During the summer and winter seasons, the daily usage of the electric heat generating apparatus is generally constant. However, during the intermediate seasons of spring and fall, usage rates may fluctuate quite substantially. In particular, the temperature of the ambient may be at a relatively low level during the evening hours; whereas, during the daylight hours only a minimal quantity of heat may be required to maintain a comfortable level within the various zones of the building. At such time, during the evening hours, the building may be unoccupied whereby the thermostatic control governing operation of the heat generating apparatus may be reset to commence operation at a relatively low temperature level. However, prior to the building being reoccupied the following day, the thermostats are reset to their normal operating temperature levels and the heat generating apparatus is required to rapidly raise the temperature of the various zones to a normal level. Accordingly, the peak demand generally occurs during this warm-up period when the temperature level is raised from a relatively low level established during the unoccupied hours to the relatively warm level required to maintain the comfort of the occupants during the normal occupied hours.

Generally, at least two stages of heating are provided in each of the zones. Typically, a building is zoned so that a portion of the zones include a peripheral building wall (peripheral zones) and a different portion of the zones are located in interior sections of the building. Obviously, the warmup period will be of less duration for the interior zones than for the peripheral zones which have greater transmission losses to the ambient.

It has been suggested that one way to minimize the peak demand rate during the intermediate seasons is to block out all but the first stage of heating in each of the zones. While the foregoing would minimize the peak load on the heat generating apparatus, the warmup period would be relatively slow, particularly for the peripheral zones. Accordingly, the suggested solution to the problem is not satisfactory from a user's standpoint.

SUMMARY OF THE INVENTION

It is an object of the present invention to limit the peak power demand placed on electrically operated heat generating apparatus serving a multizone building.

It is a further object of this invention to limit the peak demand placed on electrically operated heat generating apparatus, yet prevent the warmup period from being relatively slow.

It is a further object of the present invention to sense the load provided on heat generating apparatus and to limit the load to a predetermined maximum level.

These and other objects of the present invention are obtained in a control system for controlling the energization of electrically operated heat generating apparatus provided to supply heat to a plurality of zones in a common enclosure. The heat generating apparatus includes at least two heat generating stages in each of the various zones. The second stage heat generating apparatus in each of the zones is prevented from being activated irrespective of the temperature level in the zones when the number of the first stages already activated in each of the zones is greater than a preselected fraction of the total number of said first stage apparatus.

DESCRIPTION OF THE PREFERRED EMBODIMENT

Referring to the various figures of the drawings, there is shown a preferred electrical control system for operating a multizone heating system in accordance with the present invention. The control system to be described in detail hereinafter, regulates the operation of heating apparatus serving a building having 10 zones. The number of zones is merely representative and may be varied to suit a particular application. Suitable electrical heat generating apparatus are installed in each of the zones, the heat generating apparatus includes a plurality of stages or levels of operation. In the preferred embodiment, the unit is illustrated as having three stages. The control system of the present invention can be set to limit the electrical power used by the heating system while assuring that the available heat is generated in the zones which require the supply of heat.

Figure 2:
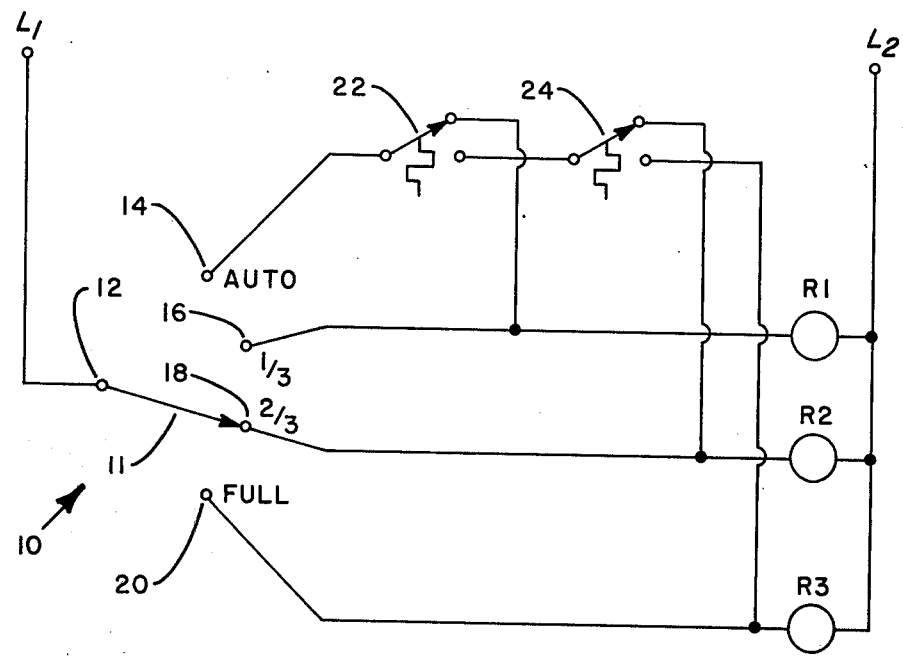
FIG. 2 is a schematic diagram of a further portion of the control of the present invention.

Referring particularly to FIG. 2, there is shown a portion of a control in accordance with the present invention. A control switch 10 includes a movable arm 11 which may be selectively placed to connect one of the terminals 14, 16, 18 or 20 to terminal 12. When the switch arm 11 is connected to terminal 14 the control device is set to operate in an automatic mode. When arm 11 is connected to either terminals 16 or 18, a desired demand limitation is established. When arm 11 is connected to terminal 20, the control is operated without any peak demand limitation.

Thermostats 22 and 24 are connected in series with terminal 14 to provide suitable thermostatic control in response to ambient temperature when the system is set to operate in an automatic mode.

A coil R1 is energized when arm 11 is connected to terminal 16. A second coil R2 is energized when terminal 18 is connected to terminal 12 via arm 11. A third coil R3 is activated when arm 11 is connected to terminal 20. The manner in which the control system functions to obtain a desired demand limitation when control switch 10 is connected to either terminal 16 or 18 shall be described in detail hereinafter. For the moment, it is sufficient to state that when arm 11 is connected to terminal 16, a one-third heat demand limitation is established; whereas, when the arm is connected to terminal 18, a maximum two-thirds heat demand limitation is established.

Figure 1:
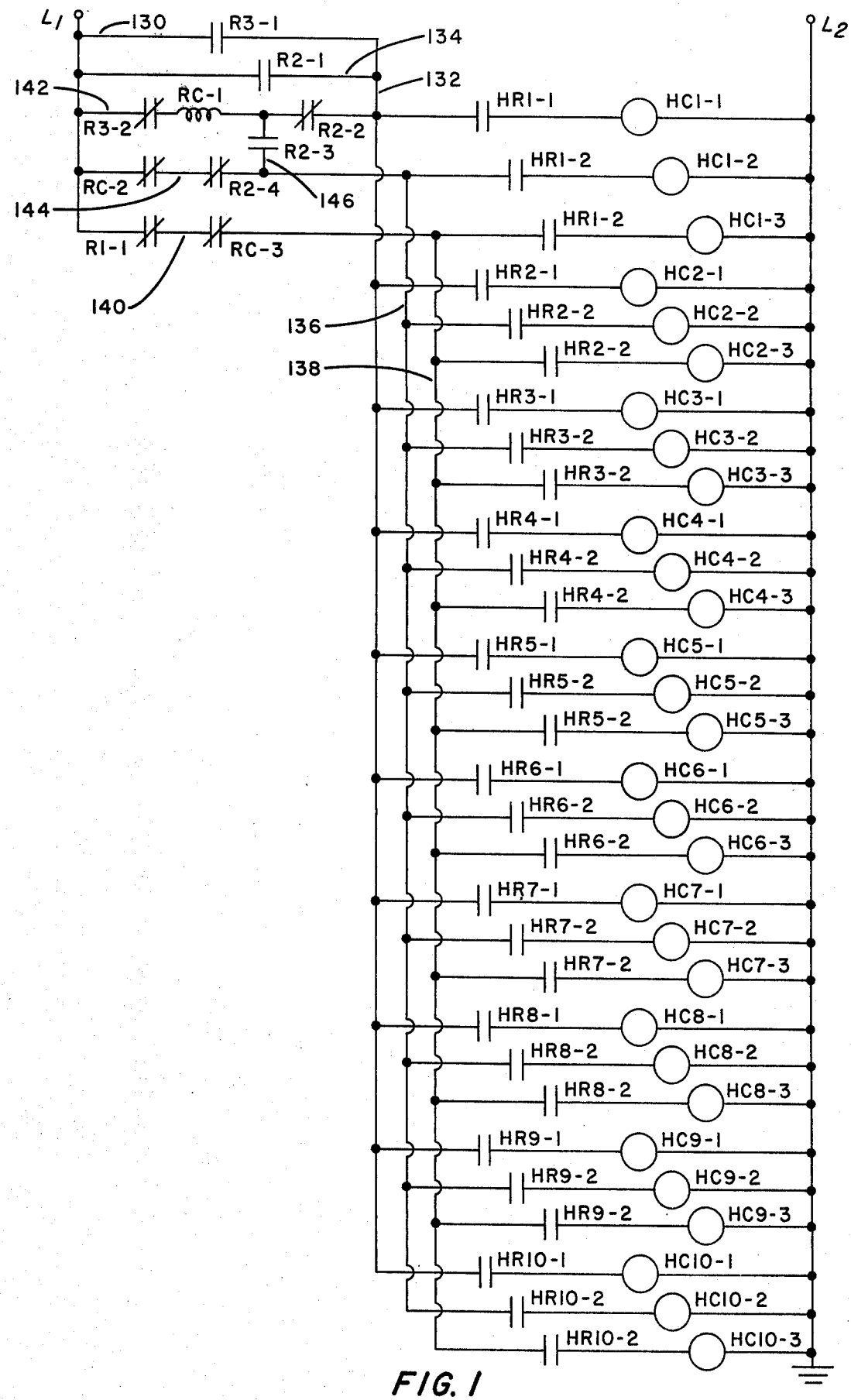
FIG. 1 is a schematic diagram of a portion of a control system in accordance with the present invention.

Referring now to FIG. 1, there is shown a further portion of a control system in accordance with the present invention. A coil RC-1 is provided to sense the magnitude of the current drawn by the remainder of the electrical devices. When coil RC-1 is energized switches RC-2 and RC-3 will open. The switches are shown in their normally closed position. Normally closed switches R3-2 and R2-2 are connected in series with coil RC-1. Switch R3-2 will open when coil R3 is energized and switch R2-2 will open when coil R2 is energized. Normally open switches R3-1 and R2-1 provide a pair of parallel shunts about coil RC-1. Switches R3-1 and R2-1 will close when their respective coils R3 and R2 are energized. Coil R2 when energized causes switch R2-3 to close and switch R2-4 to open. Energization of coil R1 causes normally closed switch R1-1 to open. The manner in which the various coils are energized to open or close the several switches will be explained in detail hereinafter.

Figure 4:
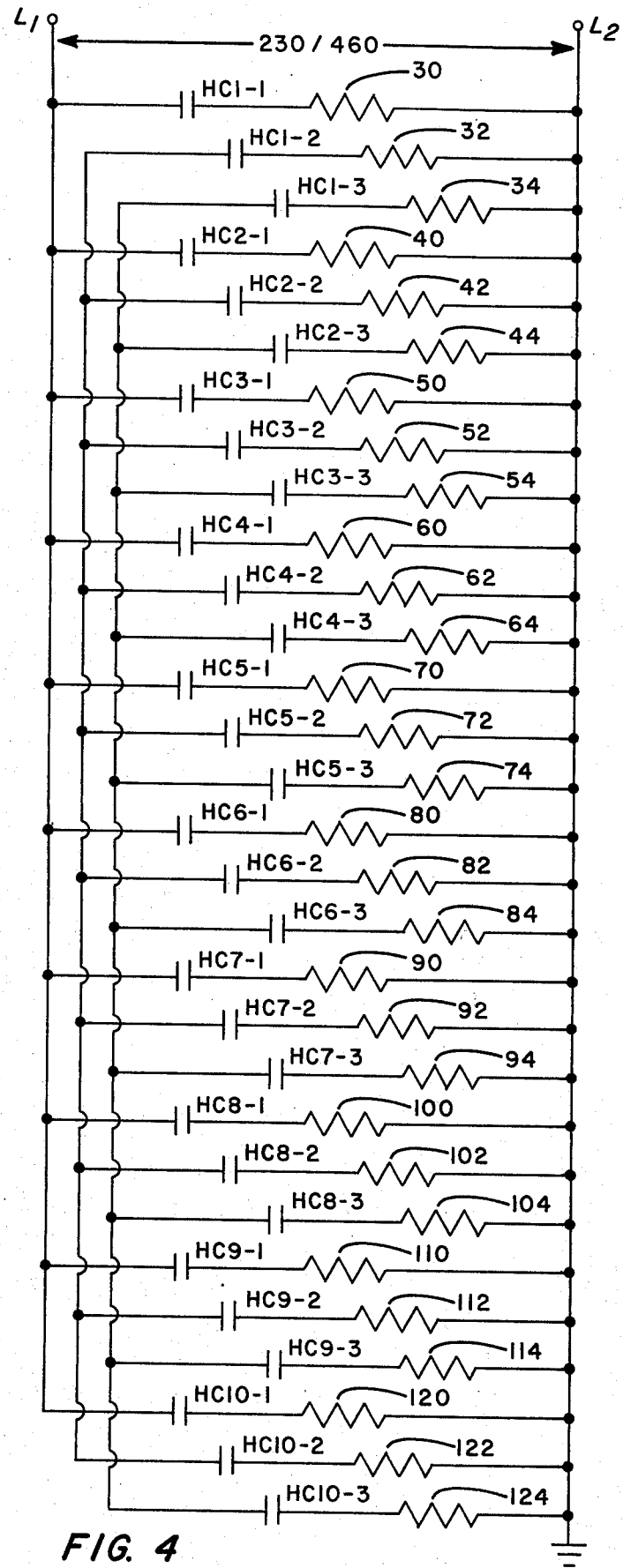
FIG. 4 is a schematic diagram of another portion of the control of the present invention.

As is illustrated in FIG. 4, each zone comprises three stages of heat. For example, the first zone comprises three stages of heat represented by elements 30, 32 and 34 connected in parallel. The second zone comprises three stages of heat represented by resistance elements 40, 42 and 44. Each of the remaining eight zones serving the entire enclosure have similar parallel connected heating elements so the tenth zone heating apparatus comprises three stages of heating elements 120, 122 and 124.

A normally open switch is connected in series with each of the respective stages of heating elements. Closure of the switch causes the heating element to be energized. For example, a normally open switch HC1-1 is connected in series with first stage element 30 of zone one. A normally open switch HC1-2 is connected in series with second stage element 32 of zone one and a normally open switch HC1-3 is connected in series with third stage element 34 of zone one. As is illustrated in FIG. 1, the operation of each normally open HC switch is controlled by a suitable HC coil. For example, the energization of coil HC1-1 shown in FIG. 1 will close switch HC1-1 shown in FIG. 4. As indicated, the closure of the HC1-1 switch will energize heater element 30 of the first zone. Similarly, energization of coils HC1-2 and HC1-3 will result in the energization of the second and third stages of the first zone.

Connected in series with each of the HC coils illustrated in FIG. 1, is a normally open HR switch. For example, with reference to FIG. 1, a switch HR1-1 is connected in series with coil HC1-1. The closure of the switch will cause the coil to be energized. As is readily observed with reference to FIG. 1, the remaining HC coils all have a normally open HR switch in series therewith.

Figure 3:
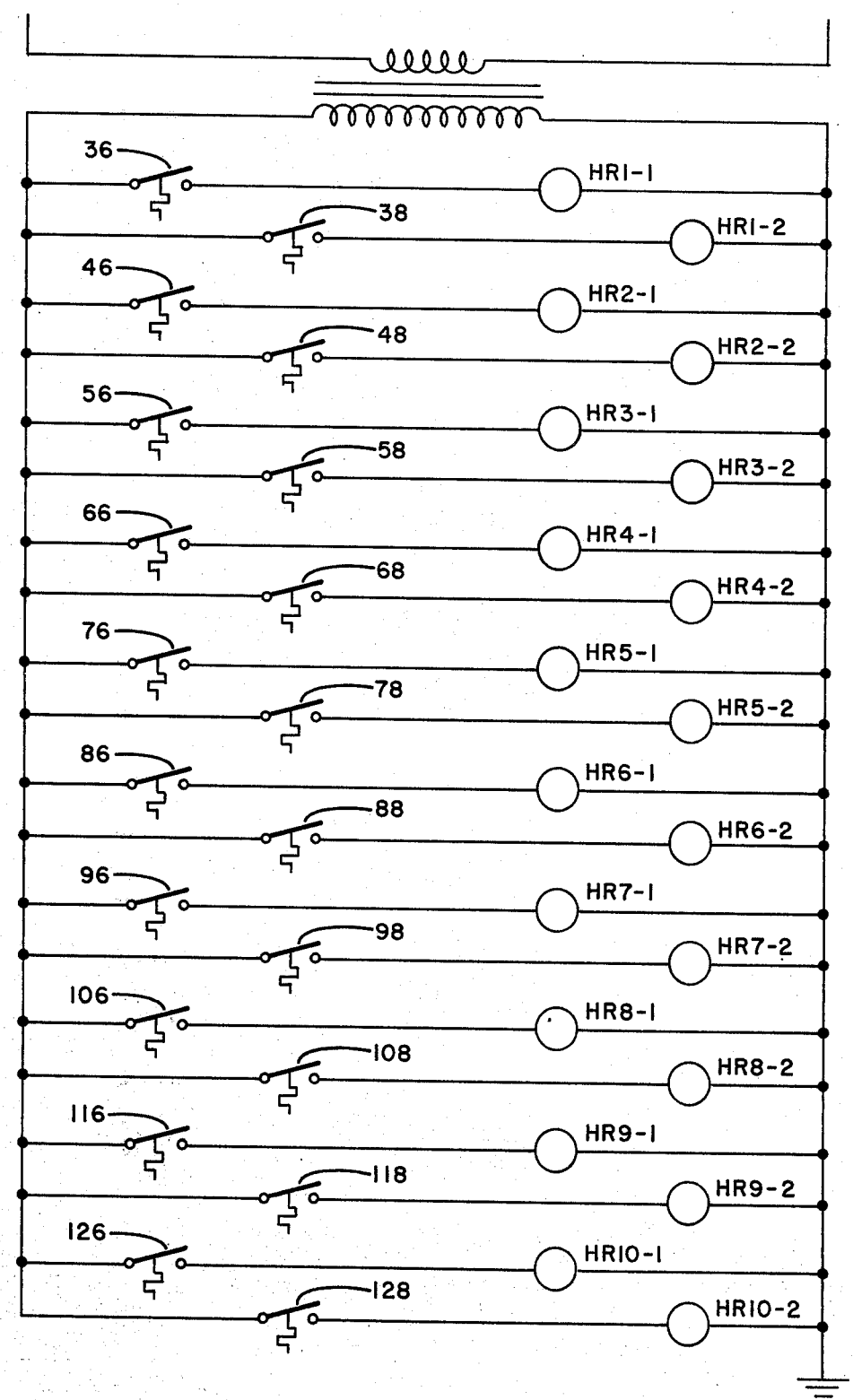
FIG. 3 is a schematic diagram of a still further portion of the control of the present invention.

Referring now to FIG. 3, there is illustrated a plurality of HR coils, each of the coils being connected in series with a normally open thermostatically controlled switch. Energization of coil HR1-1 will close normally open switch HR1-1 shown in FIG. 1. Energization of coil HR1-2 will close normally open switches HR1-2, one of the switches being connected in series with coil HC1-2 and the other HR1-2 switch being connected in series with coil HC1-3.

Thermostatically controlled switch 36 is provided to sense the temperature of the air in the first zone and to close when the temperature level is below a predetermined value. Switch 38 is provided to also sense the temperature of the air in the first zone and to close when the temperature level therein is below a second predetermined value. Switch 38 is designed to operate at a lower temperature level than is switch 36. Each of the remaining nine zones have similar normally open thermostatically controlled switches located therein.

OPERATION

The manner in which the control system hereinabove described operates will now be discussed in detail. For purposes of brevity, the system will only be described in detail in relation to two zones of heating; the remaining eight zones function in an identical manner to the two zones particularly described.

With reference to FIG. 2, assume control switch 10 is positioned in the manner illustrated whereby terminals 12 and 18 are connected to thereby energize coil R2.

With reference to FIG. 1, the energization of coil R2 will cause switch R2-1 in line 134 to close. In addition, normally closed switch R2-2 in line 142 will open as will switch R2-4 in line 144. Finally, normally open switch R2-3 in line 146 will close.

The closure of switch R2-1 provides electrical energy through line 134 to line 132. The opening of normally closed switch R2-2 and the closing of switch R2-3 connects line 136 to line 142 via line 146. Line 138 is connected to line 140 through normally closed switches R1-1 and RC-3.

Line 132 delivers electrical energy to the normally open HR switches and the HC coils comprising a portion of the control components for the first stage in each of the zones. Similarly, line 136 provides electrical energy to the control components for the second stage in each of the zones and line 138 delivers electrical energy to the control components for the third stage in each of the zones.

When zone one first stage thermostat 36 closes in response to the temperature in the zone falling to a first level below a predetermined level, coil HR1-1 is energized thereby closing normally open switch HR1-1. The closure of the switch causes coil HC1-1 to be energized thereby closing normally open switch HC1-1, shown in FIG. 4 and connected in series with first stage heating element 30.

Similarly, the closing of thermostatic switch 46 provided in the control circuit for the first stage heating element of the second zone causes coil HR2-1 to be energized. The energization of the coil closes normally open switch HR2-1 thereby energizing coil HC2-1. The energization of this coil closes normally open switch HC2-1 to permit first stage heater 40 of the second zone to deliver warm air to that zone. Likewise, the closing of any of the other first stage thermostatic switches 56, 66, 76, 86, 96, 106, 116, or 126, will cause the first stage heating element in the particular zone to be energized. If the temperature level in any of the zones is at a second level below the predetermined setting, thermostatic switches 38, 48, 58, et. seq., will close to thereby energize coils HR1-2, HR2-2, HR3-2, et. seq.

The energization of coil HR1-2 will thereby close normally open switches HR1-2 connected in series with coils HC1-2 and HC1-3. Electrical energy is supplied to coil HC1-2 through lines 136, 146 and 142. Coil HC1-3 is energized through lines 138 and 140. Energization of coil HC1-2 will close normally open switch HC1-2 to thereby energize the second stage heating element 32 in the first zone. Energization of coil HC1-3 will close normally open switch HC1-3 to thereby energize third stage element 34 in the first zone.

Similarly, the energization of coil HC2-2 will close normally open switch HC2-2 connected in series with second stage heating element 42 of the second zone. Likewise, the energization of coil HC2-3 will close normally open switch HC2-3, to thereby energize third stage element 44 of the second zone. The second and third stage heating elements in each of the remaining zones will be energized in a like manner.

With coil R2 energized, as noted before, switch R2-2 is open and switch R2-3 is closed. Current sensitive coil RC-1 thereby monitors the current flowing through line 142 to line 136. The current sensitive coil RC-1 is accordingly monitoring the energization of the second stage heating elements in all of the zones. When the total number of second stage heating elements energized in all of the zones exceeds a predetermined fraction of the total number of such stages, the current flow through coil RC-1 is also above a predetermined level whereby the coil is energized.

Energization of coil RC1 opens switches RC-3 and RC-2. The opening of switch RC-3 effectively locks out all of the third stage heating elements in each of the zones. In effect the flow of current to line 138 is discontinued. The opening of switch RC-2 at this time has no effect on the operation of the control.

With switch 11 set in the position illustrated in FIG. 2, the control system functions as follows. During the unoccupied hours, the main heating system thermostatic switch would be reset so that the heating apparatus would be energized at a lower temperature level. Immediately prior to the building becoming reoccupied, the main thermostatic switch would be reset to obtain a temperature level in each of the zones to satisfy the comfort requirements of the occupants thereof. If the ambient temperature has fallen to a relatively low level during the unoccupied hours, the heating unit would generally operate so two stages of heat in each zone would be operative.

The current flowing through the coil RC-1 at such time would be above the predetermined value causing the coil to be energized to thereby lockout the third stage heating elements of each of the zones.

The interior zones of the building generally warm up much quicker than do the perimeter zones. When a predetermined number of the zones no longer require the second stage heating elements, the current flowing through the RC-1 coil is no longer of a magnitude to energize the same. Accordingly, switch RC-3 assumes its normally closed position. With switch RC-3 in its normally closed position, the third stage heaters in those zones still requiring more than one stage of heating are energized. The energization of the third stage heating elements would be automatically accomplished as a result of the single thermostatic switches 38, 48, et. seq., controlling the energization of both second and third stage heaters. By permitting the third stage heaters to be energized at this time, the perimeter zones are warmed up at a relatively quicker rate; yet the total load demand on the heating apparatus is limited.

If it is desired to further limit the total demand on the heating apparatus, switch 10 would be positioned so arm 11 is in contact with terminal 16 whereby coil R1 is energized.

The energization of coil R1 opens normally closed switch R1-1. The opening of switch R1-1 effectively locks out all of the third stage heaters. Current to the first stage heaters will be supplied via line 132 and line 142. Current to the second stage heaters will be supplied via line 144 having normally closed switches RC-2 and R2-4 disposed therein. Line 144 is connected to line 136.

During the initial warm-up period, all of the first stage heaters in each of the zones will be energized. Accordingly, the total current passing to the first stage heaters will flow through line 142, normally closed switches R3-2 and R2-2 and coil RC-1 to line 132. The coil will be energized thereby opening normally closed switch RC-2. The opening of switch RC-2 prevents current from flowing through line 144 to line 136. Accordingly, all of the second stage heaters will be prevented from operating. When the total number of first stage heaters energized falls below a predetermined fraction of the total, the magnitude of the current flowing through coil RC-1 will fall below a predetermined value thereby deenergizing the coil. Switch RC-2 will assume its normally closed position thereby permitting current to flow to the second stage heating elements connected to line 136. The second stage heaters in those zones requiring more than one stage of heating as sensed by the thermostats associated therewith will be energized to thereby minimize the warm-up time period. The total demand on the heating apparatus will be effectively limited. Switch 10 also has an automatic position whereby arm 11 is in contact with terminal 14. Switch 10 may also be positioned with arm 11 in contact with terminal 20 so that all three stages may be energized simultaneously without any demand limitation.

The control as described herein effectively limits the maximum demand on heating apparatus, yet permits the warm-up period to be accomplished as expeditiously as possible.

While a preferred embodiment of the invention has been described and illustrated, the invention should not be limited thereto, but may be otherwise embodied within the scope of the following claims.

We claim:
1. A control system for controlling the energization of electrically operated heat generating apparatus included in a multizone electrical heating system, the heating apparatus in each of said zones including at least two parallel connected heat generating stages, the heat generating apparatus in the various zones being connected in a parallel electrical arrangement, said control system comprising:
a source of electrical energy;
means for supplying said electrical energy to said heat generating apparatus including thermostatic means to sense the temperature in each zone served by said multizone heating system, individual thermostatic means being disposed in each separate zone to sense the particular temperature therein, said individual thermostatic means including a first switch to connect a first one of said stages in a zone to said source of electrical energy when the temperature in said zone is at a first level below a desired level in said zone, said individual thermostatic means including a second switch to connect said other stage in said zone to said source of said electrical energy when the temperature in said zone is at a second level below the desired level, said first stage being maintained energized when the second stage is also energized; and overriding means to prevent energization of said other stage irrespective of the temperature level in said zone, said overriding means being operable when the number of said first stages energized in each of said zones is greater than a preselected fraction of the total of said first stages.

2. A method for controlling the energization of electrically operated heat generating apparatus included in a multizone electrical heating system, the heating apparatus in each of said zones including at least two parallel connected heat generating stages, the heat generating apparatus in the various zones being connected in a parallel electrical arrangement, said method comprising the steps of:

connecting the heat generating apparatus to a source of electrical energy;

separately sensing the temperature level in each individual zone;

activating the first stage heat generating apparatus in a particular zone when the temperature is at a first level below a desired level;

activating the second stage heat generating apparatus in a particular zone while maintaining the first stage heat generating apparatus active, when the temperature in the particular zone is at second level below the desired level; and preventing any of the second stage heat generating apparatus from being activated irrespective of the temperature level in any zone when the number of said first stages activated in each of said zones is greater than a preselected fraction of the total of said first stages.

3. A control system for controlling the energization of electrically operated heat generating apparatus included in a multizone electrical heating system, the heating apparatus in each of said zones including at least two parallel connected heat generating stages, the heat generating apparatus in the various zones being connected in parallel electrical arrangement, said control system comprising:

a source electrical energy;

means for supplying said electrical energy to said heat generating apparatus including individual thermostatic means disposed in each separate zone to independently sense the temperature of each zone, each of said individual thermostatic means including a first switch to connect a first stage of said heat generating apparatus to said source of electrical energy when the temperature in said separate zone is below a desired level, and a second switch to connect a second stage of said heat generating apparatus to said source of electrical energy when the temperature in said separate zone is at a second level below the desired level, said first stage being maintained active when said second stage is also activated; and current sensing means in series with said heat generating apparatus to sense the current drawn by said apparatus, said current sensing means including switch means to prevent said second stage heat generating apparatus from being connected to said source of electrical energy irrespective of the temperature level in each of said zones when the current drawn by said heat generating apparatus exceeds a predetermined value, said switch means being inactive when the current drawn by said apparatus decreases below a predetermined value.

4. A control system in accordance with claim 1 wherein said overriding means includes means to sense the current drawn by said heat generating apparatus.

5. A control system for controlling the energization of electrically operated heat generating apparatus included in a multizone electrical heating system, the heating apparatus including at least three parallel connected heat generating stages, the heat generating apparatus in the various zones being connected in a parallel electrical arrangement, said control system comprising:

a source of electrical energy;

means for supplying said electrical energy to said heat generating apparatus including thermostatic means to sense the temperature in each zone served by said multizone heating system, individual thermostatic means being disposed in each separate zone to sense the particular temperature therein, said individual thermostatic means including a first switch to connect a first one of said stages in a zone to said source of electrical energy when the temperature in said zone is at a first level below a desired level in said zone, and a second switch to connect said second and third stages in said zone to said source of electrical energy when the temperature in said zone is at a second level below the desired level, said first stage being maintained energized; and overriding means selectively placed in series with said first or second heat generating stages, said overriding means preventing energization of any of said second and third stages when placed in series with said first stages when the number of said first stages energized in each of said zones is greater than a preselected fraction of the total of said first stages, and preventing energization of any of said third stages when placed in series with said second stages when the number of said second stages energized in each of said zones is greater than a preselected fraction of the total of said second stages.

6. A control system in accordance with claim 5 wherein said overriding means includes means to sense the current drawn by said heat generating apparatus.

7. A control system in accordance with claim 6 wherein said second and third stages are simultaneously connected to said source of electrical energy when the temperature in said zone is at said second level when the number of said second stages energized in each of said zones is less than said preselected fraction of the total of said second stages.

8. A control system in accordance with claim 5 wherein said second and third stages are simultaneously connected to said source of electrical energy when the temperature in said zone is at said second level when the number of said second stages energized in each of said zones is less than said preselected fraction of the total of said second stages.

* * * * *